(12) United States Patent
Shiva et al.

(10) Patent No.: US 9,594,579 B2
(45) Date of Patent: Mar. 14, 2017

(54) MIGRATING VIRTUAL MACHINES

(75) Inventors: SM Prakash Shiva, Bangalore (IN); Jerome Rolia, Kanata (CA); Raman Ramteke Venkatesh, Bangalore (IN); Mustazirul Islam, Roseville, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 381 days.

(21) Appl. No.: 14/234,640

(22) PCT Filed: Jul. 29, 2011

(86) PCT No.: PCT/US2011/045939
§ 371 (c)(1),
(2), (4) Date: Jan. 24, 2014

(87) PCT Pub. No.: WO2013/019185
PCT Pub. Date: Feb. 7, 2013

(65) Prior Publication Data
US 2014/0165063 A1    Jun. 12, 2014

(51) Int. Cl.
*G06F 9/455*    (2006.01)
*G06F 9/48*    (2006.01)
(Continued)

(52) U.S. Cl.
CPC ...... *G06F 9/45533* (2013.01); *G06F 9/45558* (2013.01); *G06F 9/4862* (2013.01);
(Continued)

(58) Field of Classification Search
CPC ....... G06F 2009/4557; G06F 2201/815; H04L 67/10
See application file for complete search history.

(56) References Cited

U.S. PATENT DOCUMENTS

| 5,745,735 A | 4/1998 | Cohn et al. |
| 5,802,062 A | 9/1998 | Gehani |

(Continued)

FOREIGN PATENT DOCUMENTS

| CN | 101449258 A | 6/2009 |
| CN | 101593133 A | 12/2009 |

(Continued)

OTHER PUBLICATIONS

Raja Wasim Ahmad et al., A survey on virtual machine migration and server consolidation framework for cloud data centers, 2015, retrieved online on Oct. 25, 2016, pp. 1-15. Retrieved from the Internet: <URL: https://umexpert.um.edu.my/file/publication/00001293_119212.pdf>.*

(Continued)

*Primary Examiner* — Tuan Q. Dam
*Assistant Examiner* — Hanh T Bui
(74) *Attorney, Agent, or Firm* — Hanley Flight & Zimmerman LLC

(57) ABSTRACT

Example methods, apparatus and articles of manufacture to migrate virtual machines are disclosed. A disclosed example method includes identifying via a processor a first virtual machine to be migrated from a first host to a second host to improve a performance of the first virtual machine, determining that a frequency threshold associated with the first virtual machine will not be exceeded if the first virtual machine is migrated, determining a reliability rating for the first virtual machine, and migrating the first virtual machine to the second host based on the frequency threshold and the reliability rating.

20 Claims, 9 Drawing Sheets

(51) Int. Cl.
*G06F 21/57* (2013.01)
*H04L 29/08* (2006.01)

(52) U.S. Cl.
CPC ............ *G06F 9/4875* (2013.01); *G06F 21/57* (2013.01); *G06F 2009/4557* (2013.01); *G06F 2201/815* (2013.01); *H04L 67/10* (2013.01)

(56) References Cited

U.S. PATENT DOCUMENTS

| | | |
|---|---|---|
| 6,321,337 B1 | 11/2001 | Reshef |
| 6,421,739 B1 | 7/2002 | Holiday |
| 6,732,139 B1 | 5/2004 | Dillenberger |
| 6,901,522 B2 | 5/2005 | Buch |
| 6,934,952 B2 | 8/2005 | Sarkar |
| 6,944,699 B1 | 9/2005 | Bugnion et al. |
| 6,970,902 B1 | 11/2005 | Moon |
| 6,985,951 B2 | 1/2006 | Kubala |
| 7,089,558 B2 | 8/2006 | Baskey |
| 7,127,625 B2 | 10/2006 | Farkas et al. |
| 7,174,381 B2 | 2/2007 | Gulko |
| 7,203,944 B1 | 4/2007 | Van Rietschote |
| 7,480,908 B1 | 1/2009 | Tene |
| 7,925,923 B1* | 4/2011 | Hyser ................... G06F 11/203 714/11 |
| 8,175,863 B1* | 5/2012 | Ostermeyer ........ G06F 17/5009 703/13 |
| 8,181,175 B1 | 5/2012 | McKee |
| 8,185,893 B2 | 5/2012 | Hyser |
| 8,185,894 B1* | 5/2012 | Watson ................... G06F 9/485 718/1 |
| 8,296,760 B2 | 10/2012 | Magenheimer |
| 8,341,626 B1 | 12/2012 | Gardner |
| 8,615,579 B1* | 12/2013 | Vincent ................. G06F 9/4856 709/223 |
| 8,732,699 B1 | 5/2014 | Hyser |
| 8,903,888 B1 | 12/2014 | Hyser |
| 8,910,152 B1 | 12/2014 | Hyser |
| 9,092,250 B1 | 7/2015 | Hyser |
| 9,141,625 B1* | 9/2015 | Thornewell ....... G06F 17/30079 |
| 2002/0194389 A1 | 12/2002 | Worley, Jr. et al. |
| 2004/0010787 A1 | 1/2004 | Traut |
| 2004/0117539 A1 | 6/2004 | Bennett et al. |
| 2004/0186920 A1 | 9/2004 | Birdwell et al. |
| 2004/0193476 A1 | 9/2004 | Aerdts |
| 2005/0039180 A1 | 2/2005 | Fultheim |
| 2005/0060590 A1 | 3/2005 | Bradley et al. |
| 2005/0149940 A1 | 7/2005 | Calinescu |
| 2005/0166074 A1 | 7/2005 | Hack |
| 2005/0166075 A1 | 7/2005 | Hack |
| 2005/0246505 A1 | 11/2005 | Mckenney et al. |
| 2005/0251802 A1 | 11/2005 | Bozek |
| 2005/0278722 A1 | 12/2005 | Armstrong et al. |
| 2006/0023884 A1 | 2/2006 | Mckee |
| 2006/0041733 A1 | 2/2006 | Hyser |
| 2006/0075067 A1 | 4/2006 | Blackmore |
| 2006/0136913 A1 | 6/2006 | Sameske |
| 2006/0149906 A1 | 7/2006 | Misra |
| 2006/0195715 A1 | 8/2006 | Herington |
| 2006/0200819 A1 | 9/2006 | Cherkasova |
| 2006/0200820 A1 | 9/2006 | Cherkasova |
| 2006/0200821 A1 | 9/2006 | Cherkasova |
| 2006/0230407 A1 | 10/2006 | Rosu |
| 2006/0245665 A1 | 11/2006 | Lee |
| 2007/0043860 A1 | 2/2007 | Pabari |
| 2007/0067435 A1 | 3/2007 | Landis |
| 2007/0079307 A1 | 4/2007 | Dhawan |
| 2007/0083642 A1 | 4/2007 | Diedrich |
| 2007/0124474 A1 | 5/2007 | Margulis |
| 2007/0171921 A1 | 7/2007 | Wookey |
| 2007/0180280 A1 | 8/2007 | Bolan |
| 2007/0180448 A1 | 8/2007 | Low |
| 2007/0180450 A1 | 8/2007 | Croft |
| 2007/0186212 A1 | 8/2007 | Mazzaferri |
| 2007/0204266 A1 | 8/2007 | Beaty et al. |
| 2008/0082977 A1 | 4/2008 | Araujo et al. |
| 2008/0104587 A1 | 5/2008 | Magenheimer |
| 2008/0104608 A1 | 5/2008 | Hyser et al. |
| 2008/0222638 A1* | 9/2008 | Beaty .................. G06F 9/45558 718/100 |
| 2009/0007106 A1* | 1/2009 | Araujo, Jr. ................ G06F 9/54 718/1 |
| 2009/0106409 A1 | 4/2009 | Murata |
| 2009/0106571 A1 | 4/2009 | Low et al. |
| 2009/0210527 A1 | 8/2009 | Kawato |
| 2009/0323706 A1* | 12/2009 | Germain ............. H04L 67/1097 370/401 |
| 2010/0153514 A1* | 6/2010 | Dabagh ............... G06F 13/4022 709/213 |
| 2010/0180275 A1 | 7/2010 | Neogi et al. |
| 2010/0242045 A1* | 9/2010 | Swamy .................. G06F 9/455 718/104 |
| 2010/0250744 A1 | 9/2010 | Hadad et al. |
| 2010/0262974 A1 | 10/2010 | Uyeda |
| 2010/0333089 A1 | 12/2010 | Talwar et al. |
| 2011/0010515 A1* | 1/2011 | Ranade ............... G06F 11/1451 711/162 |
| 2011/0040575 A1* | 2/2011 | Wright ................. G06Q 10/06 705/3 |
| 2011/0099548 A1 | 4/2011 | Shen et al. |
| 2011/0131576 A1* | 6/2011 | Ikegaya ................. G06F 9/455 718/1 |
| 2011/0145380 A1* | 6/2011 | Glikson ............... G06F 9/4856 709/223 |
| 2011/0161491 A1* | 6/2011 | Sekiguchi ............. G06F 9/4856 709/224 |
| 2011/0161851 A1 | 6/2011 | Barber et al. |
| 2011/0185007 A1* | 7/2011 | Sugawara ............. G06F 9/4856 709/201 |
| 2011/0270945 A1* | 11/2011 | Shiga ..................... G06F 3/0605 709/213 |
| 2012/0016977 A1* | 1/2012 | Robertson ............... H04L 63/20 709/224 |
| 2012/0066677 A1* | 3/2012 | Tang ..................... G06F 9/4856 718/1 |
| 2012/0137285 A1* | 5/2012 | Glikson ................ G06F 9/5077 718/1 |
| 2013/0086272 A1* | 4/2013 | Chen ..................... G06F 9/4856 709/226 |
| 2013/0339956 A1* | 12/2013 | Murase ................... G06F 9/505 718/1 |
| 2014/0165063 A1* | 6/2014 | Shiva ..................... G06F 21/57 718/1 |
| 2014/0223556 A1* | 8/2014 | Bignon ............... H04L 63/1441 726/22 |
| 2015/0195141 A1* | 7/2015 | Luft .................... H04L 41/5006 709/223 |
| 2015/0277779 A1* | 10/2015 | Devarapalli .......... G06F 3/0611 711/162 |

FOREIGN PATENT DOCUMENTS

| | | |
|---|---|---|
| CN | 101876921 | 11/2010 |
| CN | 101916207 A | 12/2010 |

OTHER PUBLICATIONS

Haikun Liu et al., Performance and Energy Modeling for Live Migration of Virtual Machine, ACM, Jun. 2011, retrieved online on Oct. 25, 2016, pp. 171-181. Retrieved from the Internet: <URL: http://delivery.acm.org/10.1145/2000000/1996154/p171-liu.pdf?ip=151.207.250.71&id=1996154&acc=ACTIVE%20SERVICE&key=C15944E53D0ACA63%2E4D4702B0C3E38B35%2E4D4702B0C3E>.*
Bose, S.K., Sundarrajan, S., "Optimizing Migration of Virtual machines across Data-Centers," IEEE Xplore, Dec. 28, 2009, 306-313, (7 pages).
Bozman, J.S., Chen, G.P., "Optimizing Hardware for X86 Server Virtualization," IDC, Aug. 2009, 1-18, (18 pages).

(56) References Cited

OTHER PUBLICATIONS

Korean Intellectual Property Office, International Search Report and Written Opinion, Mar. 16, 2012, Daejeon, Republic of Korea, 3 pages.
European Patent Office, Extended European Search Report, Dec. 1, 2014, 10 pages, Munich, Germany.
Wood T et al.: Sandpiper: Black-box and gray-box resource management for virtual machines, Computer Networks, Elsevier Science Publishers B.V., Amsterdam, NL, vol. 53, No. 17, Dec. 3, 2009, pp. 2923-2938, XP026765086.
Hou et al., "A Genetic Algorithm for Multiprocessor Scheduling," IEEE Transactions on Parallel and Distributed Systems, vol. 5, No. 2, Feb. 1994, pp. 1-8.
Megow et al., "Stochastic Online Scheduling on Parallel Machine," Springer-Verlag Berlin Heidelberg, 2005 (14 pages).
Thefreedictionary, Virtual Machine, 2006 (3 pages).
VMware Technology Network, "VMware VirtualCenter 1.2 Support Documentation," http://www.vmware.com/support/vc12/doc/c13migrationover.html, Oct. 25, 2006 (8 pages).
Wikipedia, Hypervisor, Sep. 2006 (2 pages).
Wikipedia, Virtual Machine, Sep. 2006 (6 pages).
YarKhan et al., "Experiments with Scheduling Using Simulated Annealing in a Grid Environment," Springer-Verlag Berlin Heidelberg, pp. 232-242, 2002.

\* cited by examiner

| HOST 108 [SIZE: 10] | HOSTING VM A1[1], VM A2[4] | AVAILABLE [5] |
|---|---|---|
| HOST 110 [SIZE: 6] | HOSTING VM B1[6] | AVAILABLE [0] |
| HOST 112 [SIZE: 6] | HOSTING VM A3[5] | AVAILABLE [1] |

302

| VIRTUAL MACHINE | HOST1 | HOST2 | HOST3 |
|---|---|---|---|
| VM A1 114 | X | X | X |
| VM A2 116 | X | X | X |
| VM B1 118 | 1 | X | X |
| VM A3 120 | 0 | X | X |

304

| VIRTUAL MACHINE | HOST1 | HOST2 | HOST3 |
|---|---|---|---|
| VM A1 114 | 0 | 1 | 0 |
| VM A2 116 | 0 | 4 | 3 |
| VM B1 118 | 1 | 0 | 5 |
| VM A3 120 | 0 | 5 | 0 |

| VIRTUAL MACHINE | SECURITY RANK |
|---|---|
| VM A1 114 | LOW |
| VM A2 116 | MEDIUM |
| VM B1 118 | HIGH |
| VM A3 120 | HIGH |

MIGRATING VIRTUAL MACHINES

BACKGROUND

Many computing processes are virtualized to enable efficient partitioning of remote host resources among multiple users. The resources of a host are partitioned into respective system and/or process-based virtual machines. Some virtual machines may be statically provisioned to service an organization (e.g., a business, a corporation, a government entity, a school, etc.) while other virtual machines may be dynamically provisioned to service individual users, Oftentimes, virtual machines have to be migrated between different hosts. For example, a virtual machine may be migrated when a host is operating close to capacity, when a host experiences an operational issue, or when a host needs to be deactivated for servicing. In these examples, operators of the migrated virtual machines attempt to reduce a time the virtual machines are offline and/or unavailable to users.

BRIEF DESCRIPTION OF THE DRAWINGS

FIGS. 3-7 show example tables used by the example virtual machine manager of FIGS. 1 and 2 to determine which virtual machines to migrate.

DETAILED DESCRIPTION

Figure 1:
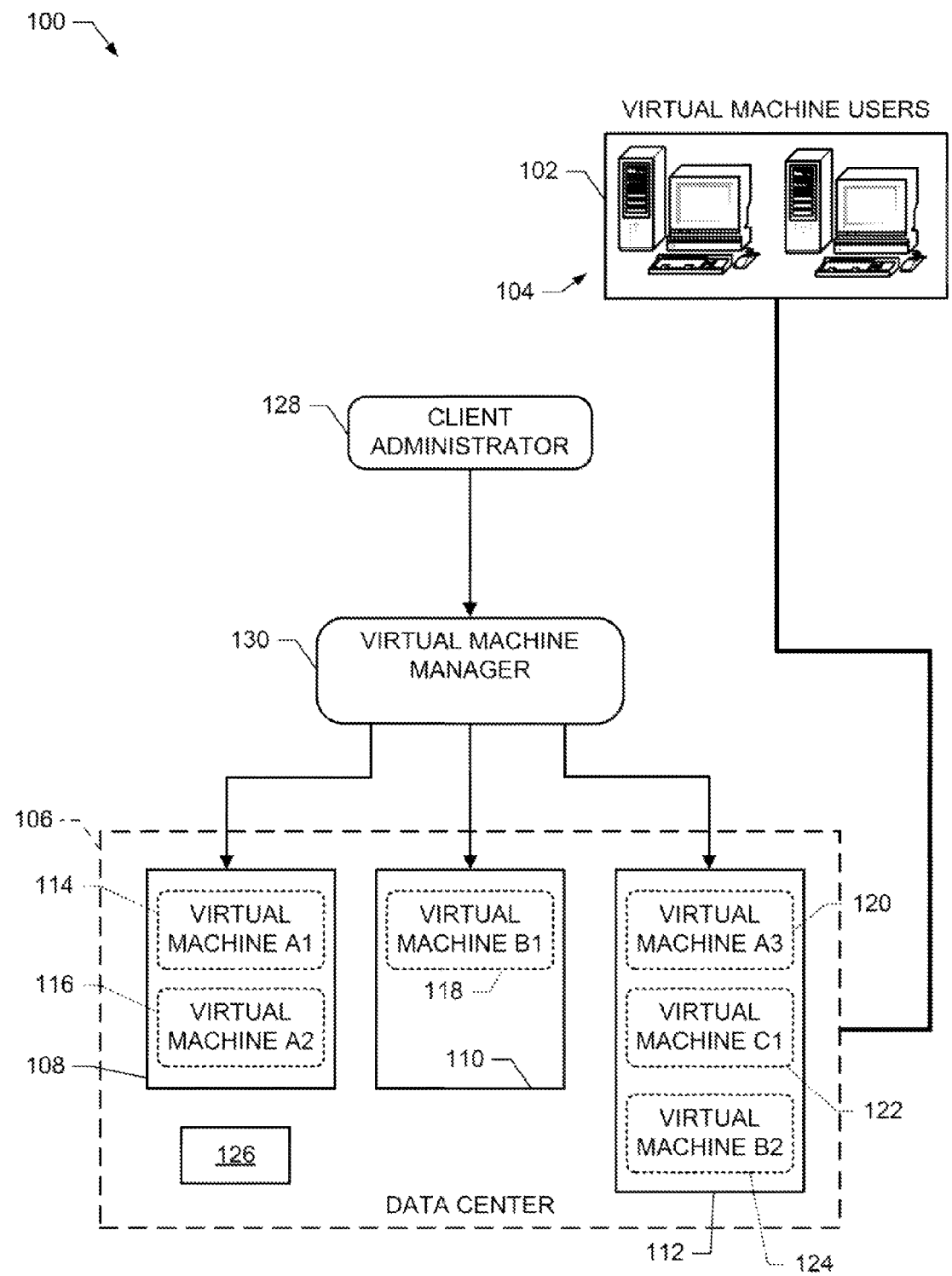
FIG. 1 is a schematic illustration of an example system and/or example virtual machine manager constructed pursuant to the teachings of this disclosure to migrate virtual machines.

Virtual machines are instances of applications operating on a host in a virtual environment and which are only accessible to designated users. Many virtual machines are implemented on hosts (e.g., servers, blade servers, server racks, processors, computers, microprocessors, etc.) that are remote and/or centrally located in relation to users. The remoteness of virtual machines enables clients and/or customers to lease and/or purchase processing capacity and/or bandwidth allocated among at least one host instead of purchasing and/or leasing physical devices. In these instances, a virtual machine is instantiated to operate for the client and/or customers using allocated partitions of one or more hosts. These virtual machines also enable clients and/or customers to access data and/or use proprietary processes from any location and/or from any device (e.g., cloud computing).

Data center operators frequently migrate virtual machines between hosts for various reasons including, for example, to alleviate performance issues, to improve capacity allocations, and/or to support maintenance tasks. Some known methods of migrating virtual machines include procedures to reduce a downtime of the virtual machines by increasing a speed at which the virtual machines are migrated. Other known methods include using rule sets specified by clients and/or customers that describe which servers and/or physical locations can host a virtual machine. In yet other known methods, virtual machines are migrated based on manual selections by data center operators.

The migration of virtual machines can incur security risks. For example, a virtual machine migration can be disturbed by malicious competition for networking and/or processing resources of components (e.g., switches, servers, processors, etc.) used to migrate the virtual machines. In other examples, virtual machine migration provides access to a virtual machine state which includes, for example, sensitive application data (e.g., user identification, passwords), application states, an operating system kernel memory, etc. These potential security risks may deter some customers and/or clients from wanting their virtual machines migrated.

Additionally, different virtual machines can have different costs to migrate. For example, some virtual machines may utilize more memory, thereby requiring a relatively longer migration time that consumes relatively more bandwidth. Some virtual machines may have frequently updated memory, which makes completing the migration process more difficult because memory states have to be transmitted more frequently. In yet other examples, some virtual machines may require specialized provisioning to accommodate a unique application, thereby increasing a time to migrate and provision a virtual machine on a new host. In many known methods, data center operators do not quantify these costs when determining which virtual machines to migrate.

Further, customers and/or clients who own and/or lease virtual machines may want to limit how frequently the virtual machines are migrated to reduce an impact on business services. For example, a client who leases a virtual machine may not want virtual machines operating a customer-facing storefront application to be migrated more than three times per week to reduce an amount of time the storefront is unavailable to customers. Additionally, customers and/or clients may want to specify during what times and/or on which days virtual machines may be migrated. While some known methods consider customer and/or client preferences, these known methods only consider the affects of migrating virtual machines associated with one client and/or customer.

Example systems, methods, apparatus, and articles of manufacture disclosed herein address at least some these problems by determining an impact of migrating differing numbers of virtual machines between hosts based on a combination of virtual machine performance, host capacity, known security preferences, quantifications of migration cost, and/or estimations of migration risk. The example systems, methods, apparatus, and articles of manufacture disclosed herein enable customers and/or clients of virtual machines to specify security criteria, performance thresholds, and/or frequency thresholds that a data center operator uses to determine which virtual machines should be migrated. This enables customers and/or clients to have confidence that any migrations of their virtual machines should not adversely affect hosted operators and/or services.

The example systems, methods, apparatus, and articles of manufacture disclosed herein also provide direction for data center operators as to which virtual machines can be migrated based on capacity conditions of hosts and/or measured performance of the virtual machines. The example data center operators use the example systems, methods, apparatus, and articles of manufacture disclosed herein to determine how many migrations of virtual machines are needed to achieve certain capacity savings among hosts and/or to overcome performance issues among at least some of the hosted virtual machines. For example, instead of determining that performance of one virtual machine may be improved with one migration, the example systems, methods, apparatus, and articles of manufacture disclosed herein coordinate migrations of multiple virtual machines to improve capacity among hosts while maintaining and/or improving performance among the virtual machines.

Additionally, the example systems, methods, apparatus, and articles of manufacture disclosed herein migrate virtual machines operating similar applications to hosts that have hardware, firmware, software and/or other resources that are specifically configured for the applications, thereby improving performance of the virtual machines while improving efficiency among the hosts. In this manner, capacity on hosts can be improved by consolidating virtual machines on hosts with similar applications, services, and/or operating systems so that each host does not have to be configured to operate different types of applications, services, and/or operating systems. Further, consolidating similar types of virtual machines helps improve logistics and/or operations of data centers.

The example systems, methods, apparatus, and articles of manufacture disclosed herein also help data centers maintain satisfaction among clients and/or customers by only migrating virtual machines based on conditions specified by the clients and/or customers. For example, in many known data centers, virtual machines are migrated based on capacity constraints of hosts resulting from increases in traffic from customers and/or clients. However, migrating a frequently used virtual machine may cause a service disruption during a time when the virtual machine is used most often and may expose the virtual machine to security risks. The example systems, methods, apparatus, and articles of manufacture disclosed herein enable these customers and/or clients to specify that a slight performance reduction is acceptable instead of temporarily removing a virtual machine from service during migration and exposing the virtual machine to possible security threats.

While the example systems, methods, apparatus, and articles of manufacture disclosed herein are described in conjunction with migrating virtual machines among hosts including, for example servers, the example systems, methods, apparatus and articles of manufacture disclosed herein may migrate virtual machines among processors, network switches, controllers, memories, databases, computers, etc. Further, while the example systems, methods, apparatus and articles of manufacture disclosed herein are described in conjunction with migrating virtual machines provisioned for an organization, the example systems, methods, apparatus and articles of manufacture disclosed herein may be implemented for network providers, service providers, cloud computing operators, government agencies, individual users, etc.

FIG. 1 shows an example system 100 constructed in accordance with the teachings of the disclosure to migrate virtual machines. The example system includes virtual machine users 102, which may include a government, a corporation, a company, individual users subscribed to a service, etc. The example virtual machine users 102 includes workstations 104 (e.g., computers and/or processors) that enable users to interface with applications and/or data hosted by, for example, a data center 106. The example workstations 104 are communicatively coupled to the data center 106 via any wired and/or wireless communication medium (e.g., the Internet, a Local Area Network. etc.). The example workstations 104 may be implemented by any type of computing device including, for example, a personal computer, a server, a laptop, a smartphone, a smartpad, etc.

In the illustrated example, the data center 106 includes hosts 108, 110, and 112. The example hosts 108-112 include any type of server, blade server, processor, computer, memory, database, controller, and/or network switch that can operate virtual machines 114-124. In some examples, the data center 106 is located in a single physical location. Alternatively, the data center 106 may represent different physical locations where the hosts 108-112 are geographically separate from each other. In other examples, the data center 106 can include additional hosts, fewer hosts, additional virtual machines, and/or fewer virtual machines.

The example data center 106 of FIG. 1 is managed by a data center operator 126. The example data center operator 126 provisions the hosts 108-112 for the virtual machines 114-124 based on information provided by, for example, a client administrator 128. The example data center operator 126 also routes and/or switches communications between the workstations 104 to the virtual machines 114-124 operating on the respective hosts 108-112. The data center operator 126 may use any router, switch, and/or server for routing the communications within the data center 106. The example data center operator 126 also maintains tables that identity which virtual machine 114-124 is located on which host 108-112.

The example client administrator 128 includes any customer and/or client who requests from the data center 106 one or more of the virtual machines 114-124 to host, for example, an application, data, service, etc. The example client administrator 128 may be associated with an organization that includes, for example, the virtual machine users 102. For example, the client administrator 128 may include an Internet Technology (IT) department of a company and the virtual machine users 102 are employees and/or contractors of the company. In other examples, the client administrator 128 may include a service provider and the virtual machine users 102 subscribe to access a virtual machine. For example, the client administrator 128 leases the virtual machine 114. In this example, the virtual machine users 102 subscribe to the client administrator 128 to access applications and/or data hosted by the virtual machine 114. In other examples, the client administrator 128 may include a company with an online storefront hosted by the virtual machine 114. In these other examples, the virtual machine users 102 access a webpage hosted by the virtual machine 114 to purchase services and/or goods provided by the client administrator 128.

The client administrator 128 provides requirements for hosting a virtual machine including an amount of bandwidth, Internet Protocol (IP) addresses to be associated with a virtual machine, geographic preferences for the virtual machine, an operating system type supported by the virtual machine, applications to be operated by the virtual machine, memory to be available for the virtual machine, data storage capacity, etc. Additionally, the example client administrator 128 can specify minimum performance thresholds for a virtual machine, a security risk ranking to be associated with a virtual machine, and/or an allowed migration frequency for a virtual machine. Further, the example client administrator 128 may provide logistic information including billing information.

To process requests from the example client administrator 128 and/or to manage the example virtual machines 114-124 within the data center 106, the example system 100 includes a virtual machine manager 130. The example virtual machine manager 130 provisions the hosts 108-112 based on information provided by the example client administrator 128. The virtual machine manager 130 provisions the hosts 108-112 by allocating processing and/or memory capacity from among the hosts 108-112 for the virtual machines 114-124 and/or configuring hardware, firmware, software, and/or any other resources on the hosts 108-112 to operate the virtual machines 114-124. The example virtual machine manager 130 also updates routing tables within the data center 106 so communications from, for example, the workstations 104 are routed to the appropriate virtual machines 114-124.

In the illustrated example, the virtual machine manager 130 is shown external to the data center 106, in this example, the example virtual machine manager 130 may be operated by an entity separate from the data center 106. In these examples, the virtual machine manager 130 may also migrate virtual machines among hosts included in different data centers. Alternatively, the virtual machine manager 130 and the data center 106 may be operated and/or managed by the same entity. In these alternative examples, the virtual machine manager 130 may be included within the data center 106.

The example virtual machine manager 130 of FIG. 1 uses provisioning and/or management information provided by, for example, the client administrator 128 to determine which of the virtual machines 114-124 can be migrated among the hosts 108-112. In this manner, the example virtual machine manager 130 coordinates operation of the virtual machines 114-124 within the example data center 106. The example virtual machine manager 130 includes monitors that determine capacity of the hosts 108-112 and measure performance (e.g., a Quality of Service (QoS)) provided by the virtual machines 114-124. The example virtual machine manager 130 determines if there are any capacity and/or performance issues by comparing measured capacity of the hosts 108-112 to known capacity constraints and comparing measured performance of the virtual machines 114-124 to client specified performance thresholds.

The example virtual machine manager 130 of the illustrated example determines to migrate the virtual machines 114-124 if capacity approaches and/or exceeds capacity limits and/or performance approaches and/or exceeds the thresholds. To determine which of the virtual machines 114-124 to migrate, the example virtual machine manager 130 determines an impact on capacity and/or performance as a result of moving each of the virtual machines 114-124. For example, the virtual machine manager 130 initially determines an impact on capacity of the hosts 108-112 based on migrating the virtual machine 114. The example virtual machine manager 130 also determines an impact on performance by migrating the virtual machine 114 to either of the hosts 110 and 112. In some examples, the virtual machine 114 may be migrated only if the impact of migrating the virtual machine is less than an impact threshold.

Additionally, the example virtual machine manager 130 determines security risks for migrating each of the virtual machines 114-124. The security risks may be specified by, for example, the client administrator 128. In the example of FIG. 1, the virtual machine manager 130 may determine that either of the virtual machines 114 and 124 should be migrated to the host 110. The virtual machine manager 130 then determines that the virtual machine 114 has a relatively low security risk (e.g., a security risk less than a first threshold security risk) while the virtual machine 124 has a relatively high security risk (e.g., a security risk greater than the first security risk and/or a second security risk). In some examples, the virtual machine manager 130 determines the security risk of the virtual machines 114, 124 by looking up respective security rankings and/or security values placed on the virtual machines 114, 124 by their respective client(s), owner(s), lessor(s), and/or user(s). Any other past, present, and/or future method(s) to determine the security risk associated with the virtual machines may additionally or alternatively be used. Based on the security risks, the virtual manager 130 determines that the virtual machine 114 with the relatively low security risk should be migrated to the host 110. In some instances where, for example, the capacity of the host 112 is significantly exceeded, the virtual machine manager 130 may determine that migrating the virtual machine 124 to reduce capacity on the host 124 outweighs the security risks. In other examples, the virtual machine manager 130 may determine initially which of the virtual machines 114-124 are associated with relatively high security risks and identify only low security risk virtual machines to migrate.

In addition to determining security risks, the example virtual machine manager 130 of FIG. 1 determines migration frequencies and/or reliability ratings of the virtual machines 114-124. The migration frequency and/or the reliability rating may be specified by, for example, the client administrator 128. Alternatively, the reliability rating may be determined based on previous observed difficulties of migrating a virtual machine. In some instances, the virtual machine manager 130 may use migration frequency and/or the reliability rating to rank which of the virtual machines 14-124 should be migrated. In other instances, the severity of capacity and/or performance issues may cause the virtual machine manager 130 to migrate the virtual machines 114-124 regardless of an allowed migration frequency and/or reliability rating.

Prior to migrating the virtual machines 114-124, the example virtual machine manager 130 determines if any of the identified virtual machines to be migrated will exceed a specified (e.g., allowed) migration frequency, For example, the virtual machine manager 130 may determine that the virtual machine 114 with a migration frequency of two moves per 24 hour time period has already been migrated twice in the past day. In this example, the virtual machine manager 130 determines that the virtual machine 114 is currently not available to migrate and selects another of the virtual machines 116-124 to migrate, Alternatively, the example virtual machine manager 130 may initially filter out which of the virtual machines 1140-124 to migrate based on current migration frequency before determining which virtual machines should be migrated to resolve capacity/performance issues.

The example virtual machine manager 130 of FIG. 1 uses reliability ratings to determine which of the virtual machines 114-124 to migrate. The reliability ratings describe the difficulty of migrating a virtual machine including, for example, provisioning time, migration time, operator supervision, provision validation procedures, and/or application or service complexity. In some instances, the reliability rating may be based on a time of day and/or configurations of hosts receiving the virtual machine. For example, if the hosts 108 and 110 are configured for a UNIX operating environment and the host 112 has a Windows operating environment, the virtual machine manager 130 may determine that migrating the virtual machine 114 to the host 110 has a relatively better reliability rating compared to migrating the virtual machine 114 to the host 112.

The example virtual machine manager 130 of the illustrated example migrates the virtual machines 114-124 after identifying which virtual machines should not be migrated based on security risks, migration frequencies, and/or reliability ratings. In some instances, the example virtual machine manager 130 may determine that the virtual machine 114 can be migrated to the host 110. In these instances, the example virtual machine manager 130 then iteratively determines any additional capacity savings and/or performance improvements from migrating any of the other virtual machines 116-124 concurrently and/or subsequently to migrating the virtual machine 114. Thus, in some examples, the virtual machine manager 130 determines a total capacity savings and total performance improvement based on concurrently migrating a group and/or set of virtual machines.

Figure 2:
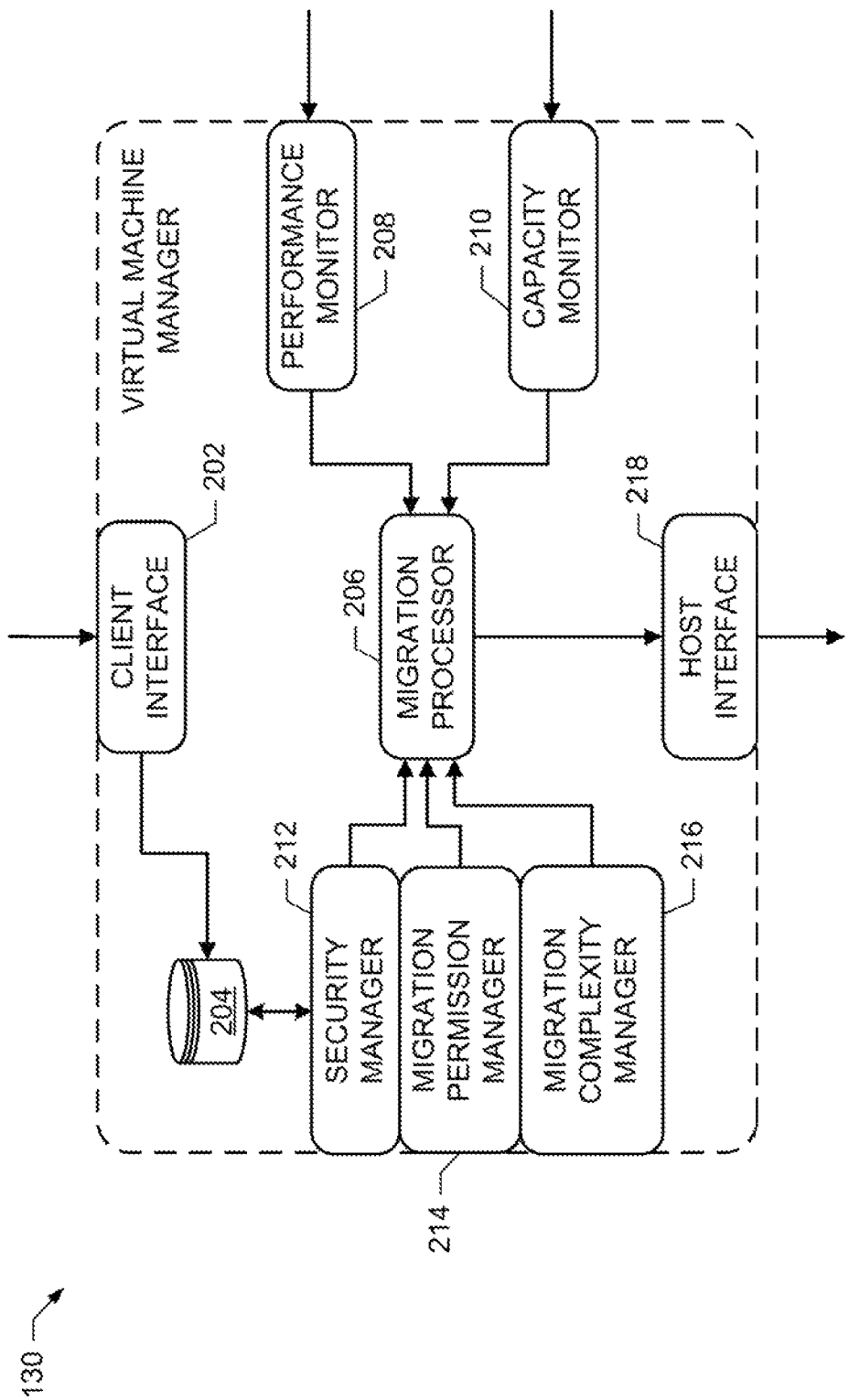
FIG. 2 shows the example virtual machine manager of FIG. 1.

FIG. 2 shows a diagram of the example virtual machine manager 130 of FIG. 1. To interface with the example client administrator 128 of FIG, 1, the example virtual machine manager 130 includes a client interface 202. The example client interface 202 provides, for example, an application programming interface (API) that the client administrator 128 utilizes to specify provisioning and/or migration information for the virtual machines 114-124. For example, the client administrator 128 provides information via data fields in a webpage managed by the client interface 202. Alternatively, the client interface 202 may include personnel that communicate with the client administrator 128 (e.g., phone operators).

The example client interface 202 of FIG. 2 stores the provisioning and/or migration information to a virtual machine database 204. The example virtual machine database 204 also stores locations of the virtual machines 114-124 and/or routing information to reach the virtual machines 114-124. The example virtual machine database 204 further stores permission information that specifies which virtual machines 114-124 the virtual machine users 102 of FIG. 1 can access. The permission information may also specify which of the users 102 have read access, write access, and/or subscribe access to services and/or data provided by the virtual machines 114-124. The virtual machine database 204 may he implemented by, for example, storage disk(s) disk array(s), tape drive(s), volatile and/or non-volatile memory, compact disc(s) (CD), digital versatile disc(s) (DVD), floppy disk(s), read-only memory (ROM), random-access memory (RAM), programmable ROM (PROM), electronically-programmable ROM (EPROM), electronically-erasable PROM (EEPROM), optical storage disk(s), optical storage device(s), magnetic storage disk(s), magnetic storage device(s), cache(s), and/or any other storage media in which data is stored for any duration.

The example client interface 202 of the illustrated example enables, for example, the client administrator 128 to access associated information within the virtual machine database 204. For example, the client administrator 128 uses the client interface 202 to modify a security risk, a migration frequency threshold, a performance threshold, and/or a reliability rating of a virtual machine. In other instances, the client administrator 128 specifies, via the client interface 202, a time of day and/or a day of the week that a virtual machine is allowed to be migrated.

To determine which of the virtual machines 114-124 to migrate, the example virtual machine manager 130 of FIG. 2 includes a migration processor 206 (e.g., a consolidation analysis engine). The example migration processor 206 analyzes capacity measurements of the hosts 108-112 and performance measurements of the virtual machines 114-124 to determine which virtual machines to migrate. The example migration processor 206 receives virtual machine performance information from a performance monitor 208 and capacity information from a capacity monitor 210.

The example performance monitor 208 of FIG. 2 measures performance metrics of the virtual machines 114-124 The example performance monitor 208 measures, for example, memory utilization, bandwidth usage, and/or central processing unit operations per a time period for the virtual machines 114-124. The example performance monitor 208 may also measure performance of the virtual machines 114-124 using QoS metrics including, for example, service violations. The example performance monitor 208 transmits measured performance data to the migration processor 206 for analysis.

The example capacity monitor 210 measures an amount of capacity utilized by each of the hosts 108-112. The example capacity monitor 210 determines capacity based on, for example, an amount of resources of the hosts 108-112 utilized by each of the virtual machines 114-124. The example capacity monitor 210 transmits capacity data to the migration processor 206 for analysis.

The example migration processor 206 uses the capacity and/or performance data to determine any performance and/or capacity issues. For example, the migration processor 206 determines that the virtual machine 114 is operating at a performance level (e.g., a QoS) below a threshold specified by the client administrator 128. In other examples, the migration processor 206 may determine which of the hosts 108-112 are operating at capacity and/or beyond capacity In both of these examples, the migration processor 206 determines which of the virtual machines 114-124 can be migrated to reduce the performance and/or capacity issues.

The example migration processor 206 of the illustrated example also uses the capacity and/or performance data from the respective monitors 208 and 210 to determine performance and/or capacity impacts of migrating the virtual machines 114-124. For example, the migration processor 206 may use the data to determine how total capacity of the data center 106 can be reduced by migrating some of the virtual machines 114-124 to different hosts (e.g., migrating the virtual machine 118 to the host 112 to enable the virtual machine manager 130 to deactivate the host 110, thereby reducing energy consumption). In other examples, the migration processor 206 may use the data to determine how an average performance of the virtual machines 114-124 can be improved by migrating some of the virtual machines 114-124.

In some examples, the migration processor 206 of FIG. 2 uses algorithms, routines, and/or functions to predict and/or estimate capacity and/or performance changes of migrating the virtual machines 114-124. For example, an unused capacity on the host 110 (e.g., $A_{host110}$) is expressed in example equation (1) where max_shares is the maximum capacity of the host 110 and peak_shares_used is the amount of capacity utilized by the host 110.

$$A_{host110} = \text{max\_shares}_{host110} - \text{peak\_shares\_used}_{host110} \qquad (1)$$

The example migration processor 206 determines a capacity savings $S_{v2}$ based on migrating the virtual machine 114 to the host 110 using an example equation (2). The capacity savings is related to moving the workload v from the virtual machine 114 to the host 110.

$$S_{v2} = A_{host108} - A_{host110} \qquad (2)$$

The example migration processor 206 also calculates capacity savings and/or decreases in capacity based on migrating the other virtual machines 116-124 to determine which of the virtual machines 114-124 should be migrated to best utilize capacity among the hosts 108-112. In some instances, the example migration processor 206 predicts future capacity and/or performance of the virtual machines 114-124 based on historical trace data of previous virtual machine performance. The historical trace data is stored in, for example, the virtual machine database 204.

The example migration processor 206 of FIG. 2 also deter which of the identified virtual machines 114-124 can be migrated based on security ranks, reliability ratings, and/or migration frequency thresholds. To determine a security rank and/or level for each of the virtual machines 114-124, the example migration processor 206 accesses a security manager 212. The example migration processor 206 provides the security manager 212 with identifiers of the virtual machines 114-124. The example security manager 212 uses the identifiers to retrieve a corresponding security rank from the virtual machine database 204. The example security manager 212 then transmits the security ranks of the virtual machines 114-124 to the migration processor 206 to determine which of the virtual machines 114-124 are restricted from being migrated.

To determine a migration frequency threshold, for the virtual machines 114-124, the example migration processor 206 accesses a migration permission manager 214. The example migration permission manager 214 uses identifiers of the virtual machines 114-124 to retrieve a corresponding migration frequency threshold and/or a current migration frequency for each of the virtual machines 14-124 The migration permission manager 214 then transmits tie threshold and/or current migration frequency to the migration processor 206. The example migration permission manager 214 also tracks which of the virtual machines 114-124 are migrated and updates the corresponding current migration frequency to reflect the most recent migration. Further, the migration permission manager 214 updates the current migration frequency for each of the virtual machines 114-124 for each time period.

To determine a reliability index for the virtual machines 114-124, the example migration processor 206 FIG. 2 accesses a migration complexity manager 216. The example migration complexity manager 216 uses identifiers of virtual machines to retrieve a corresponding reliability rating from the virtual machine database 204. The example migration complexity manager 216 transmits the reliability ratings to the migration processor 206.

The example migration complexity manager 216 of the illustrated example also creates and/or modifies the reliability ratings each time the corresponding virtual machines 114-124 are migrated. For example, the migration complexity manager 216 may monitor an amount of time to migrate and provision the virtual machine 114 on the host 110 and update a reliability rating to reflect the monitored time. The example migration complexity manager 216 may also create a reliability rating for each of the virtual machines 114-124 for different times of a day or different days of a week. In this manner, the example migration processor 206 may use this dayitime information to schedule virtual machine migrations when reliability ratings are relatively high (e.g., a low expected difficulty to migrate the virtual machines).

In other examples, the migration complexity manager 216 may modify the reliability ratings stored in the virtual machine database 204 based on a number and/or amount of resources needed to achieve a virtual machine migration. For example, larger memory sizes and/or more supervision to migrate a virtual machine may cause the migration complexity manager 216 to calculate a lower reliability rating. In other examples, the migration complexity manager 216 may interface with the performance monitor 208 to calculate a reliability rating based on an initial QoS of a newly migrated virtual machine.

After receiving security ranks, reliability ratings, and/or migration frequency information, the example migration processor 206 selects which virtual machines 114-124 to migrate. The example migration processor 206 selects the virtual machines to migrate by determining if any of the information restricts any of the virtual machines from being migrated. For example, virtual machines with a relatively high security rank, a relatively low reliability rating, and/or a frequency migration that exceeds an allowed migration frequency may be removed from planned migration by the migration processor 206. The migration processor 206 then migrates the remaining virtual machines using the capacity and/or performance impact calculations for the corresponding virtual machines.

Alternatively, the example migration processor 206 may calculate a migration score for each of the virtual machines 114-124 identified to be migrated. The migration score corresponds to an average weighted average, sum, etc. of a security rank, a reliability rating, a migration frequency, a performance impact, and/or a capacity savings. For example, the migration processor 206 may calculate a migration score for the virtual machine 114 moving to the host 110 based on a high reliability (e.g., a value of 3), a low security rank (e.g., a value of 3), a low number of current migrations (e.g., a value of 2), a moderate performance improvement (e.g., a value of 2), and a low capacity savings (e.g., a value of 1). In this example, the migration score is a sum of the values (e.g., a value of 9). The migration processor 206 then determines if the virtual machine 114 can be migrated if the calculated value is greater than a predetermined threshold value of '5.' In this instance, the migration processor 206 determines that the virtual machine 114 can be migrated to the host 110.

In these alternative examples, the migration processor 206 of FIG. 2 calculates migration scores for each of the virtual machines 114-124 migrating to each of the hosts 108-112 and uses a routine (e.g., an optimization algorithm) to determine which combination of virtual machine migrations generates the highest total migration score for the data center 106. In these examples, the performance and/or capacity considerations may outweigh other factors causing the migration processor 206 to migrate relatively more risky virtual machines. For example, if there is a significant capacity issue, a significant capacity savings (e.g., a value of 5) may provide enough weight to determine that a virtual machine is to be migrated regardless of other values for other factors. In these other examples, the migration processor 206 may remove from migration consideration any of the virtual machines 114-124 that, for example, have a high security ranking or a migration frequency that is above a specified threshold.

After determining which of the virtual machines 114-124 to migrate and which of the hosts 108-112 will receive the virtual machines 114-124, the example migration processor 206 of FIG. 2 sends migration instructions to a host interface 218. The example host interface 218 coordinates the migration of the virtual machines 114-124 among the hosts 108-112. For example, the host interface 218 sends instructions to the host 110 to allocate resources to operate the virtual machine 114. The instructions may include an amount of resources to allocate and/or any support software and/or firmware needed to be configured within the host 110 to operate the virtual machine 114.

In this example, the host interface 218 of FIG. 2 sends instructions to the host 108 to begin transferring memory and/or data states of the virtual machine 114 to the newly allocated portions of the host 110. The example host interface 218 may then coordinate pausing the virtual machine 114 on the host 108, transferring a final memory and/or data state to the host 110 and beginning operation of the virtual machine 114 on the host 110. The example host interface 218 may also update routing and/or forwarding tables within the data center 106 to reflect the migration of the virtual machine 114 to the host 110. Further, the example host interface 218 may update the virtual machine database 204 with the new locations of the migrated virtual machine 114 and inform the migration complexity manager 216 to update a current migration frequency of the virtual machine 114.

In examples where the example host interface 218 of FIG. 2 is to concurrently migrate multiple virtual machines 114-124, the example host interface 218 determines an order in which the virtual machines 114-124 are to be migrated so that capacity of the hosts 108-112 is not exceeded during the migration. In some instances, the host interface 218 migrates one or more virtual machines to a temporary location to facilitate multiple migrations. For example, to migrate the virtual machine 116 to the host 112 and the virtual machine 124 to the host 108, the example host interface 218 first migrates the virtual machine 116 to the host 110 to create space for the virtual machine 124 to be migrated to the host 108. The host interface 218 then migrates the virtual machine 116 to the host 112.

While an example manner of implementing the example virtual migration manager 130 has been illustrated in FIGS. 1 and 2, one or more of the elements, processes and/or devices illustrated in FIG. 2 may be combined, divided, re-arranged, omitted, eliminated and/or implemented in any other way. Further, the example client interface 202, the example virtual machine database 204, the example migration processor 206, the example performance monitor 208, the example capacity monitor 210, the example security manager 212, the example migration permission manager 214, the example migration complexity manager 216, the example host interface 218 and/or, more generally, the example virtual machine manager 130 of FIG. 2 may be implemented by hardware, software, firmware and/or any combination of hardware, software and/or firmware. Thus, for example, any or all of the example client interface 202, the example virtual machine database 204, the example migration processor 206, the example performance monitor 208, the example capacity monitor 210, the example security manager 212, the example migration permission manager 214, the example migration complexity manager 216, the example host interface 218 and/or, more generally, the example virtual machine manager 130 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended apparatus or system claims are read to cover a purely software and/or firmware implementation, at least one of the example client interface 202, the example virtual machine database 204, the example migration processor 206, the example performance monitor 208, the example capacity monitor 210, the example security manager 212, the example migration permission manager 214, the example migration complexity manager 216, and/or the example host interface 218 are hereby expressly defined to include a computer readable medium such as a memory, DVD, CD, Blu-ray disc, etc. storing the software and/or firmware. Further still, the virtual machine manager 130 of FIG. 2 may include one or more elements, processes and/or devices in addition to, or instead of, those illustrated in FIG. 2, and/or may include more than one of any or all of the illustrated elements, processes and devices.

FIGS. 3-7 show example tables used by the example migration processor 206 of FIGS, 1 and 2 to determine which of the virtual machines 114-124 to migrate among the hosts 108-112. An example table 302 of FIG. 3 shows an allocation of the virtual machines 114-120 among the hosts 108-112. In this example, the virtual machines 122 and 124 of FIG. 1 are not provisioned.

The example table 302 shows that the host 108 has a total capacity of 10 GHz and the hosts 110 and 112 each have a total capacity of 6 GHz. The example table 302 also shows that the host 108 includes the virtual machines 114 and 116, the host 110 includes the virtual machine 118, and the host includes the virtual machine 120. The example table 302 also indicates that the host 108 has 5 GHz of capacity (e.g., resources) available, the host 110 has no capacity available, and the host 112 has 1 GHz of capacity available. In other examples, the table 302 may include information specifying an amount of memory used and/or available on the hosts 108-112 or, alternatively, an amount of processor space used and/or available on the hosts 108-112.

The example migration processor 206 of FIG. 2 retrieves the example table 302 from the virtual machine database 204 to determine a current configuration of the virtual machines 114-120. The example migration processor 206 also uses the table 302 to identify capacity and/or performance issues detected by, for example, the monitors 208 and 210. For example, the migration processor 206 determines that the virtual machines 114-120 should be rearranged among the hosts 108-112 to improve capacity on the host 110.

An example table 304 shows a calculated performance by the example migration processor 206 of the effects of migrating the virtual machine 118 (e.g. VM B1) to the host 108. The '1' value in the table 304 indicates that the host 108 would need 1 GHz of additional capacity to accommodate the migration of the virtual machine 118 (e.g., the total capacity of the virtual machines 114-118 would be 11 GHz). The '1' value also indicates that the virtual machine 118 would suffer adverse performance from a lack of capacity at the host 108. The 'X' values in the table 304 indicate that the migration processor 206 has not computed the effects of migrating the virtual machines 114-118 to the hosts 108-112.

The example table 304 of FIG. 3 shows a '0' value indicating that no additional capacity would be needed to migrate the virtual machine 120 (e.g., VM A3) to the host 108. The example migration processor 206 uses this information to determine the virtual machine 120 is a candidate to be migrated to the host 108. The example migration processor 206 continues to analyze capacity and/or performance impacts of migrating each of the virtual machines 114-120 until each of the 'X' values is replaced with a numeric value, as shown in table 306. The example migration processor 206 also calculates performance and/or capacity impacts of migrating different combinations of the virtual machines 114-120. In some instances, the different combinations may correspond to calculated combinations of the values in the example table 306. The example migration processor 206 then determines which combinations of migrations results in capacity and/or performance improvements.

In other examples, the migration processor 206 utilizes other methods for determining performance a and/or capacity impacts. For example, the migration processor 206 may calculate performance using QoS violations and/or weighted performance based on an importance of workloads, In other examples, the migration processor 206 determines capacity impacts as a function of virtual machine performance.

FIG. 4 shows a table 402 of example security ranking information for the virtual machines 114-120. The example migration processor 206 retrieves the security ranking information from the virtual machine database 204 via the security manager 212 The security rankings in the table 402 are examples of possible security information that the migration processor 206 uses to determine which of the virtual machines 114-120 can be migrated. In other examples, tine table 402 includes security rankings that are based on a numeric scale.

In the example table 402 of FIG. 4, the 'Low' security ranking corresponds to a migration that would have a relatively low impact on a business if the virtual machine was compromised and/or disrupted. The 'Low' ranking may also correspond to a risk impact of 0% and a migration policy of allow. The 'Medium' security ranking corresponds to a medium impact on a business if a virtual machine is compromised and/or disputed during migration. The 'Medium' ranking may also correspond to a 25% risk impact and a migration policy of allow. Further, the 'High' security ranking corresponds to a relatively severe impact on a business if a virtual is compromised and/or disrupted during a migration. The 'High' security rank corresponds to a migration policy of deny and/or restrict.

The example risk impact indicates under which conditions it is acceptable for the migration processor 206 to migrate a virtual machine. In this example, the risk impact of 25% indicates that the virtual machine 116 can be migrated if the effective cost and/or quantity of resources used to host the virtual machine 116 is reduced by 25%. In other words, the virtual machine 116 can be migrated if capacity is improved by 25%. or performance is improved by 25%.

The example migration processor 206 uses the security rankings in the example table 402 to determine that the virtual machines 118 and 120 cannot be migrated because of the 'High' security rank. The migration processor 206 then determines whether to migrate the virtual machines 114 and 116 based on the 'Medium' and 'Low' security rankings. In some examples, the migration processor 206 may use the table 402 to determine initially which virtual machines cannot be migrated prior to determining performance and/or capacity impacts, as described in FIG. 1

Figure 5:
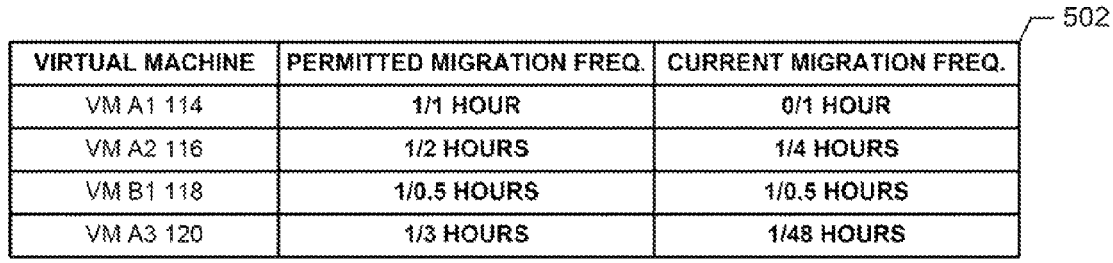

FIG. 5 shows an example table 502 that includes a permitted migration frequency and a current migration frequency for the example virtual machines 114-120. The client administrator 128 of FIG. 1 specifies the permitted migration frequency and the migration permission manager 214 determines a number of times the virtual machines 114-120 have been migrated during a time period. The migration frequency indicates an average number of times a virtual machine has been migrated. For example, the virtual machine 120 has an average migration frequency of once per 48 hours, indicting the virtual machine 120 is migrated once every two days. In other examples, the current migration frequency may correspond to a number of times in a directly previous time period that a virtual machine has been migrated. For example, the current migration frequency for the virtual machine 120 may be zero times in the past three hours. The permitted migration frequency may change based on a time of day and/or day of a week.

The example migration processor 206 uses the example table 502 to determine which of the virtual machines 114-120 may be migrated. Using the information in the table 402 of FIG. 4, the migration processor 206 in this example only has to determine if the virtual machines 114 and 116 are permitted to be migrated because the virtual machines 118 and 120 are associated with 'High' security rankings. In the illustrated example, the migration processor 206 determines that the virtual machine 114 is allowed to be migrated one time per hour and has currently not been migrated within the past hour. Additionally, the migration processor 206 determines that the virtual machine 116 is permitted to be migrated one time every two hours and has only been migrated once in the past four hours. As a result, the migration processor 206 determines that the virtual machines 114 and 116 may be migrated based on the data within table 502.

Figure 6:
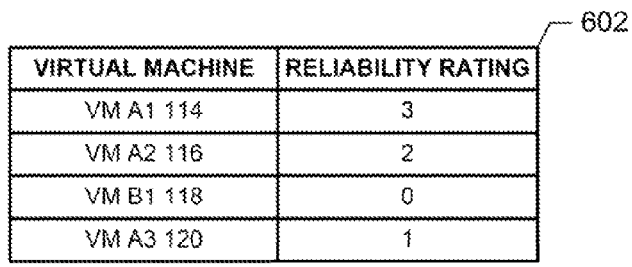

FIG. 6 shows an example table 602 that includes reliability rating information. The reliability ratings are determined by the example migration complexity manager 216 based on observed and/or expected migration difficulty for a virtual machine,. In other examples, the client administrator 128 specifies the reliability rating. The example table 602 shows the reliability ratings as numeric values with a higher value corresponding to a virtual machine that is relatively easier to migrate. In other examples, the table 602 may include additional information including average migration times, average migration bandwidth, average migration data, and/or specific migration issues for the virtual machines 114-120 The example reliability ratings in the table 602 may change based on a time of day and/or a day of the week for a virtual machine migration.

The example migration processor 206 uses the example table 602 to determine which of the virtual machines 114-120 can be migrated. Based on the determinations in conjunction with FIGS. 4 and 5, the example migration processor 206 only has to determine if the virtual machines 114 and 116 are capable of being migrated. In this example, the virtual machine 114 has a reliability rating of '3' and the virtual machine 116 has a reliability rating of '2.' The example migration processor 206 determines that both of the virtual machines 114 and 116 may be migrated based on the relatively high reliability ratings.

Figure 7:
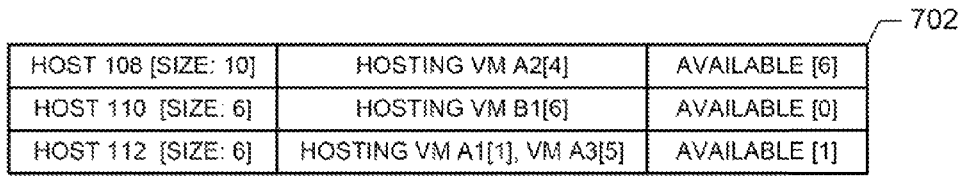
Figure 7:
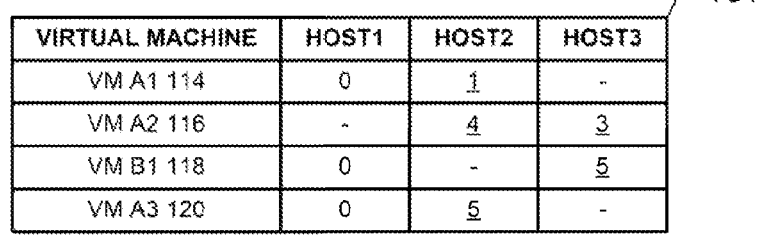

FIG. 7 shows an example table 702 that includes capacity utilization of the hosts 108-112 after the example migration processor 206 migrates the virtual machine 114 to the host 112. In this example the host 108 has 6 GHz of capacity available, the host 110 has 1 GHz of capacity available, and the host 110 has zero capacity available. In the illustrated example, the migration processor 206 determines to migrate the virtual machine 114 to the host 112 because the performance impact of operating the virtual machines 114 and 120 together on the host 112 creates a partially shared utilization of resources. In other words, the virtual machines 114 and 120 have about 1 GHz of overlapping allocation of the host 112.

An example table 704 shows a revised performance and capacity impact of the hosts 108-112 based on a planned migration of the virtual machines 108-112. The example migration processor 206 uses the performance and/or capacity impacts in conjunction with the information in the tables 402, 502, and 602 to determine which of the virtual machines 114-120 can be migrated to further improve performance and/or capacity. Thus, the example migration processor 206 can iteratively determine virtual machines to migrate based on the example methods described on conjunction with FIGS. 3-7.

In other instances, the migration processor 206 may determine the performance and/or capacity impacts shown in table 704 at some predetermined time after migrating the virtual machine 114. Alternatively, the example migration processor 206 determines which of the virtual machines 114-120 to migrate based on a detected performance and/or capacity issue. In this manner, the example migration processor 206 determines periodically if the virtual machines 114-120 should be migrated to compensate for different usages (e.g., peak usages) during different times of a day and/or different days of a week.

Flowcharts representative of example machine readable instructions for implementing the virtual machine manager 130 of FIGS. 1 and are shown in FIGS. 8A, 8B, 9, and 10. In this example, the machine readable instructions comprise a program for execution by a processor such as the processor P105 shown in the example processor platform P100 discussed below in connection with FIG. 11. The program may be embodied in software stored on a computer readable medium such as a CD, a floppy disk, a hard drive, a DVD, Blu-ray disc, or a memory associated with the processor P105, but the entire program and/or parts thereof could alternatively be executed by a device other than the processor P105 and/or embodied in firmware or dedicated hardware. Further, although the example program is described with reference to the flowcharts illustrated in FIGS. 8A, 8B, 9, and 10, many other methods of implementing the example virtual machine manager 130 may alternatively be used. For example, the order of execution of the blocks may be changed, and/or some of the blocks described may be changed, eliminated, or combined.

As mentioned above, the example machine readable instructions of FIGS. 8A, 8B, 9, and 10 may be implemented using coded instructions (e.g., computer readable instructions) stored on a tangible computer readable medium such as a hard disk drive, a flash memory, a ROM, a CD, a DVD, a Blu-ray disc, a cache, a RAM and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 8A, 8B, 9, and 10 may be implemented using coded instructions (e g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e g., for extended time periods, permanently, brief instances, for temporarily buffering, and/ or for caching of the information). As used herein, the term non-transitory computer readable medium is expressly defined to include any type of computer readable medium and to exclude propagating signals.

Figure 8A:
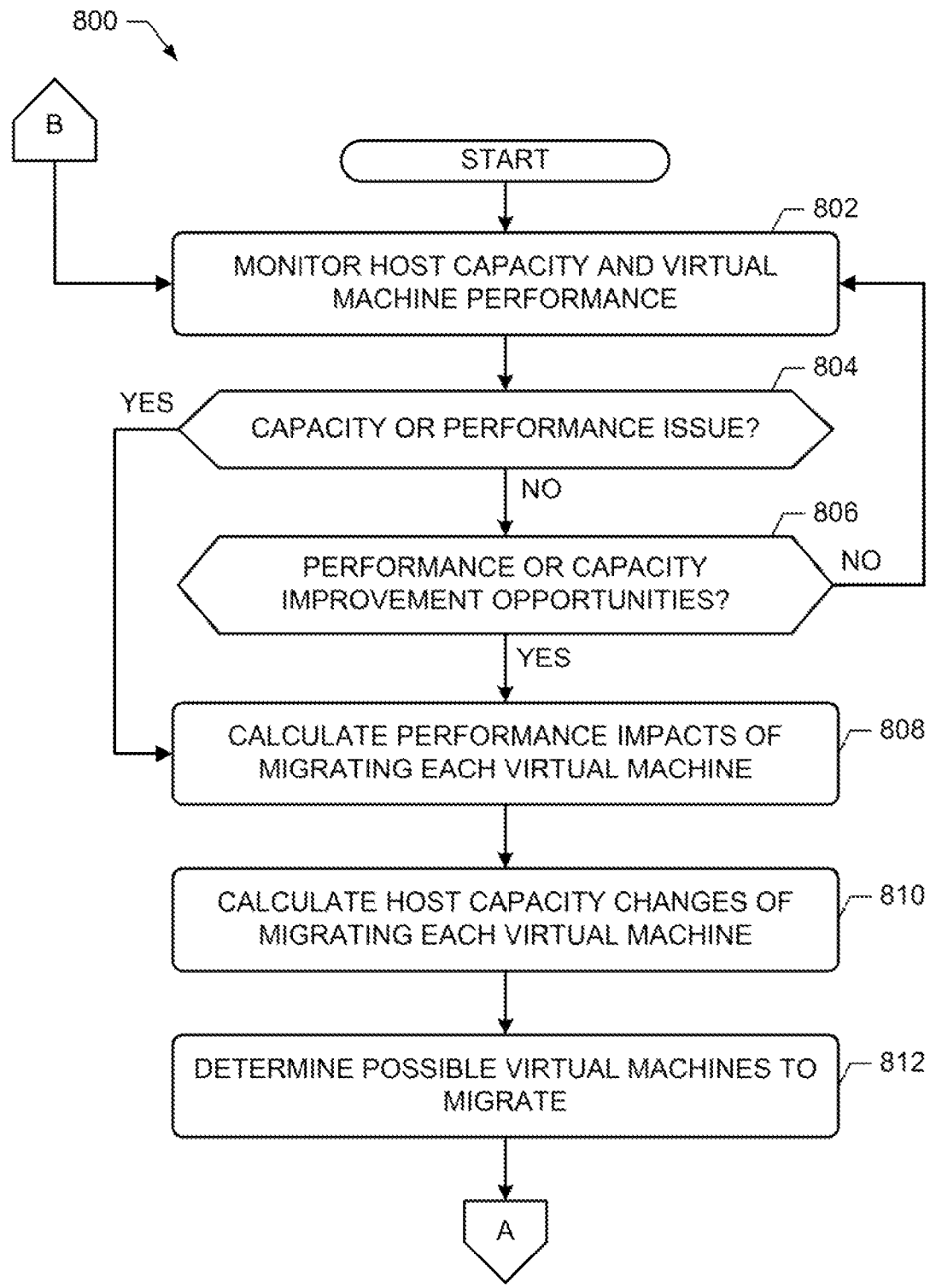
FIGS. 8A, 8B, 9, and 10 are flowcharts representative of example machine-accessible instructions, which may be executed to implement the example virtual machine manager and/or system of FIGS. 1 and 2.
Figure 8B:
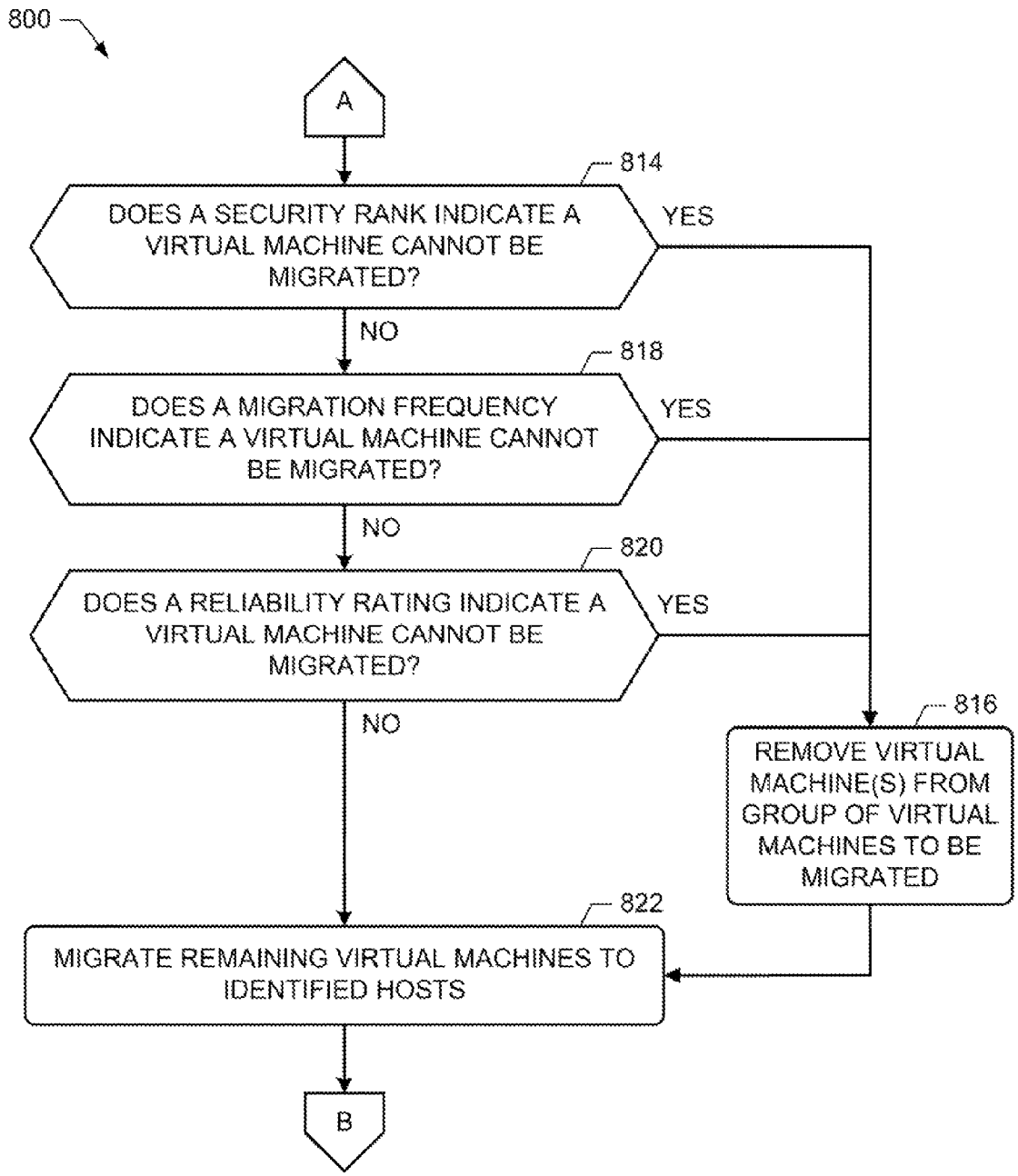

The example machine-readable instructions 800 of FIGS. 8A and 8B begin when the example monitors 208 and 210 of FIG. 2 measure or monitors host capacity and/or performance of virtual machines on the hosts (block 802). The example migration processor 206 then determines from the measured data if there is a performance and/or capacity issue (block 804). If there are no issues, the example migration processor 206 determines if there are performance and/or capacity utilization improvement opportunities (block 806). The example migration processor 206 determines if there are any opportunities for improvement by determining capacity and/or performance impacts of migrating one or more virtual machines to other hosts as described in conjunction with FIG. 3.

If the migration processor 206 determines there are no opportunities to improve capacity and/or performance, the example monitors 208 and 210 continue to measure and record host capacity and/or virtual machine performance (block 802). If there are opportunities for better utilization and/or there is at least one capacity and/or performance issue, the example migration processor 206 calculates performance impacts of migrating each virtual machine (block 808). The example migration processor 206 also calculates host capacity changes of migrating each virtual machine (block 810). Based on the determined performance impacts and/or capacity changes, the example migration processor 206 determines which virtual machines should be migrated (block 812).

The example migration processor 206 next accesses the security manager 212 to determine if security rankings indicate that one or more of the virtual machines should not be migrated (block 814). For each virtual machine with a security ranking that prevents the virtual machine from being migrated, the example migration processor 206 removes the virtual machine from the group and/or set of virtual machines to be migrated (block 816). The example migration processor 206 then accesses the migration permission manager 214 to determine if migration frequencies indicates the respective virtual machines should not be migrated (block 818). If the migration frequency restricts a virtual machine from being migrated, the example migration processor 206 removes the virtual machine from migration consideration (block 816). The example migration processor 206 next accesses the migration complexity manager 216 to determine if reliability ratings indicates the respective virtual machines should not be migrated (block 820). If the reliability rating restricts a virtual machine from being migrated, the example migration processor 206 removes the virtual machine from migration consideration (block 816).

The example migration processor 206 then migrates the remaining virtual machines to the corresponding hosts (block 822). In some examples, the migration processor 206 may determine which virtual machines should be migrated after determining which virtual machines cannot be migrated. In yet other examples, the migration processor 206 uses an average and/or weighted score of security rank, migration frequency, reliability rating, performance improvement, and/or capacity savings to determine which virtual machines to migrate. After migrating the virtual machines, the example monitors 208 and 210 return to monitoring host capacity and/or virtual machine performance (block 802).

Figure 9:
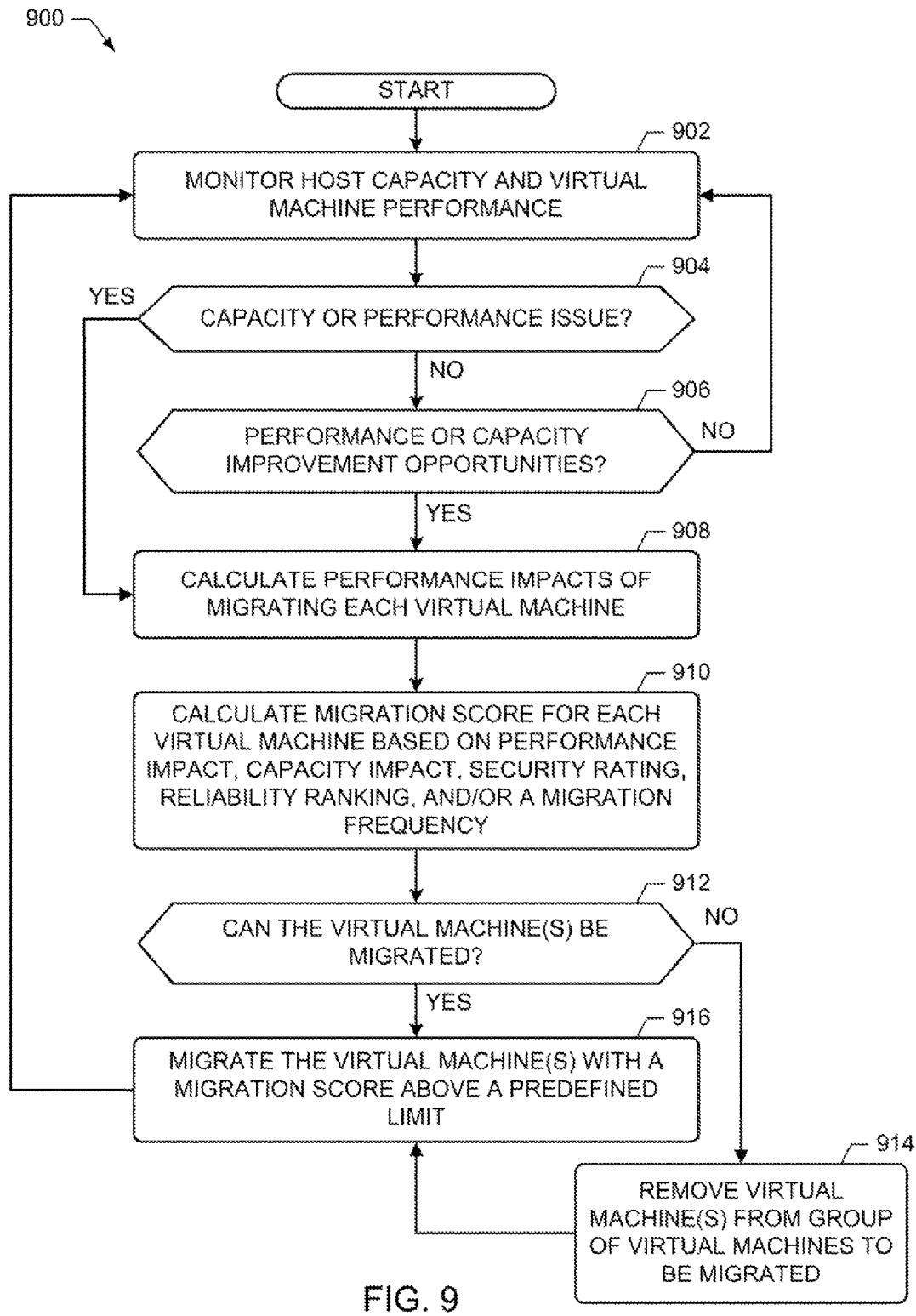

The example machine-readable instructions 900 of FIG. 9 begin when the example monitors 208 and 210 of FIG. 2 measure host capacity and/or performance of virtual machines on the hosts (block 902). The example migration processor 206 then determines from the measured data if there is a performance and/or capacity issue (block 904). If there are no issues, the example migration processor 206 determines if there are performance and/or capacity utilization improvement opportunities (block 906).

If the migration processor 206 determines there are no opportunities to improve capacity and/or performance, the example monitors 208 and 210 continue to measure and record host capacity and/or virtual machine performance (block 902). If there are opportunities for better utilization and/or there is at least one capacity and/or performance issue, the example migration processor 206 calculates performance impacts of migrating each virtual machine (block 908). To determine which virtual machines to migrate, the example migration processor 206 via the managers 212 and 216 and/or the monitors 208 and 210 calculates an average and/or weighted score of security rank, migration frequency, reliability rating, performance improvement, and/or capacity savings (block 910).

The example migration processor 206 determines which virtual machines correspond to a calculated score that is above a threshold and/or identify the virtual machines with the greatest score to determine which virtual machines can be migrated (block 912). The example migration processor 206 also determines which virtual machines have a security ranking, migration frequency, and/or reliability rating that prevent the virtual machines from being migrated (block 912). For the virtual machines that cannot be migrated, the example migration processor 206 removes the virtual machines from among the virtual machines to be migrated (block 914). The example migration processor 206, via the host interface 218, then migrates the remaining virtual machines with scores above a predefined threshold (block 912). After migrating the virtual machines, the example monitors 208 and 210 return to monitoring host capacity and/or virtual machine performance (block 902).

Figure 10:
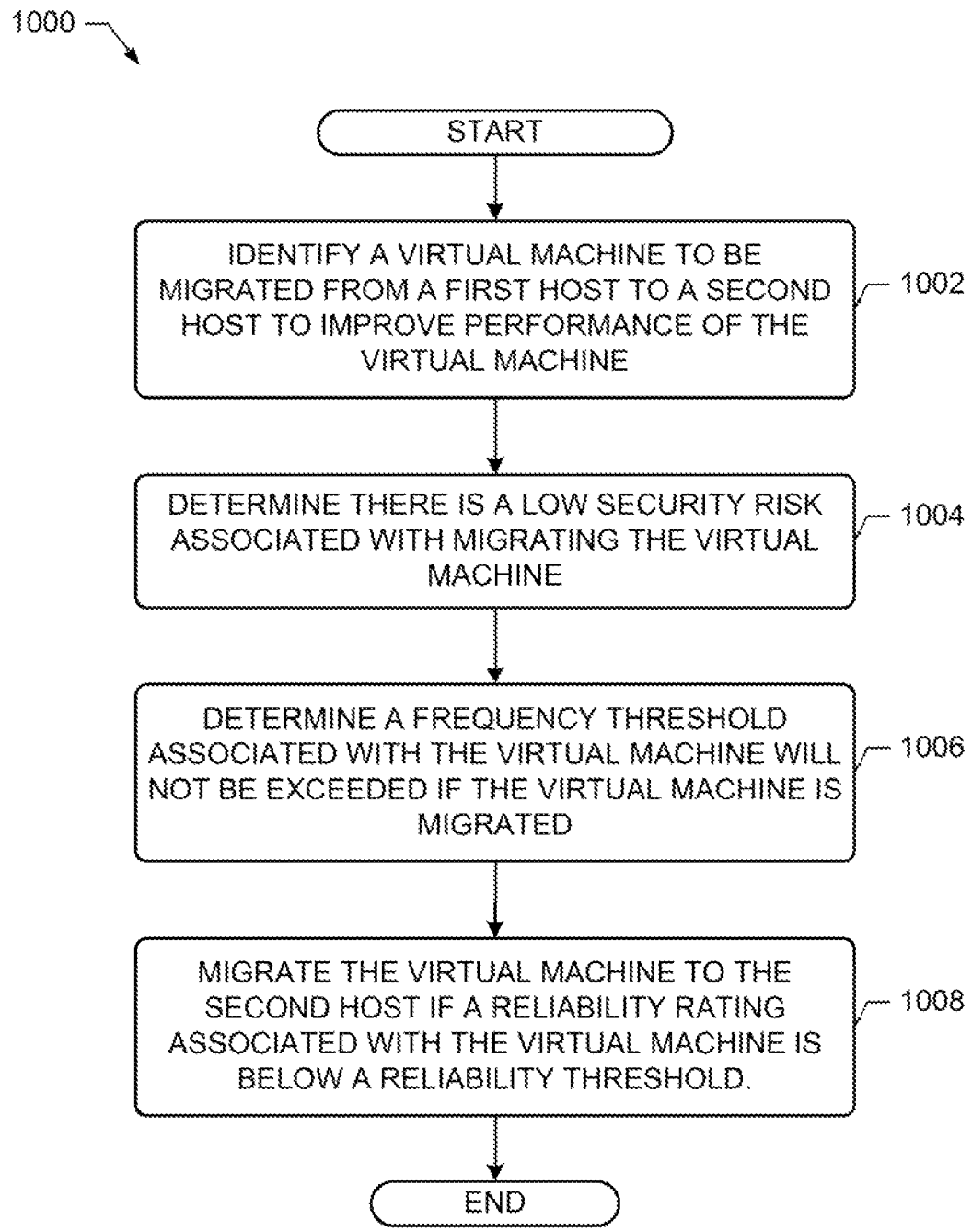

The example machine-readable instructions 1000 of FIG. 10 begin by the example migration processor 206 identifying a virtual machine to be migrated from a first, host to a second host to improve performance of the virtual machine (block 1002). The example migration processor 206 via the security manager 212 then determines there is a low security risk associated with migrating the virtual machine (block 1004). The example migration processor 206 via the migration permission manager 214 next determines a frequency threshold associated with the virtual machine will not be exceeded if the virtual machine is migrated (block 1006). The example migration processor 206 then migrates the virtual machine to the second host if the migration complexity manager 216 determines a reliability rating associated with the virtual machine is below a reliability threshold (block 1008). The example machine-readable instructions 1000 then terminate.

Figure 11:
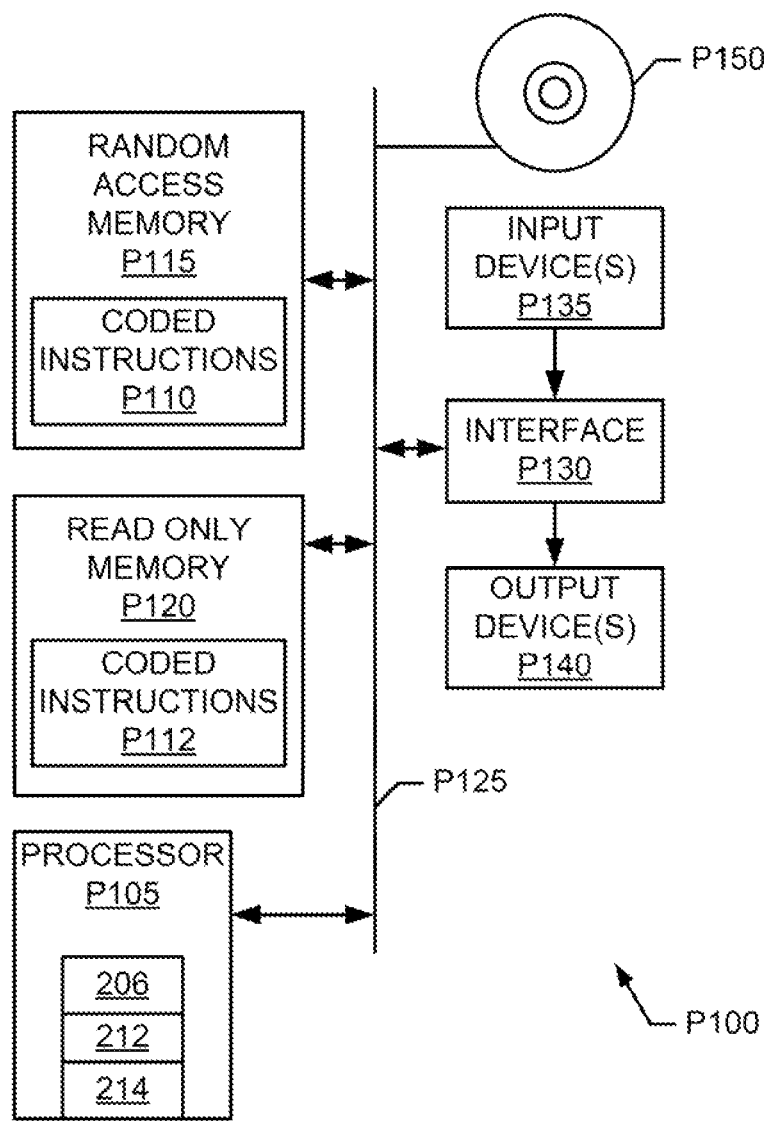
FIG. 11 is a schematic illustration of an example process platform that may be used and or programmed to execute the example processes and/or the example machine-accessible instructions of FIGS. 8A, 8B, 9, and 10 to implement any or all of the example systems, methods, apparatus and/or articles of manufacture described herein.

FIG. 11 is a schematic diagram of an example processor platform P100 that may be used and/or programmed to execute the example machine readable instructions 800, 900, and/or 1000 of FIGS. 8A, 8B, 9, and 10. One or more general-purpose processors, processor cores, microcontrollers etc may be used to implement the processor platform P100

The processor platform P100 of FIG. 11 includes at least one programmable processor P105. The processor P105 may implement, for example, the example client interface 202, the example virtual machine database 204, the example migration processor 206, the example performance monitor 208, the example capacity monitor 210, the example security manager 212, the example migration permission manager 214, the example migration complexity manager 216, the example host interface 218 and/or, more generally, the example virtual machine manager 130 of FIG. 2. For example, the migration processor 206 identifies a first virtual machine to be migrated from a first server to a second server to improve a performance of the first virtual machine and migrates the first virtual machine to the second host if a reliability rating associated with the first virtual machine is below a reliability threshold. Additionally, the security manager 212 determines if there is a low security risk associated with migrating the first virtual machine. Further, the migration permission manager 214 determines a frequency threshold associated with the first virtual machine will not be exceeded if the first virtual machine is migrated.

The processor P105 executes coded instructions P110 and/or P112 present in main memory of the processor P105 (e.g., within a RAM P115 and/or a ROM P120) and/or stored in the tangible computer-readable storage medium P150. The processor P105 may be any type of processing unit, such as a processor core, a processor and/or a microcontroller. The processor P105 may execute, among other things, the example interactions and/or the example machine-accessible instructions 800, 900, and/or 1000 of FIGS. 8A, 8B, 9, and/or 10 to migrate virtual machines, as described herein, Thus, the coded instructions P110, P112 may include the instructions 800, 900, and/or 1000 of FIGS. 8A, 8B, 9, and/or 10.

The processor P105 is in communication with the main memory (including a ROM P120 and/or the RAM P115) via a bus P125, The RAM P115 may be implemented by dynamic random access memory (DRAM), synchronous dynamic random access memory (SDRAM), and/or any other type of RAM device, and ROM may be implemented by flash memory and/or any other desired type of memory device. The tangible computer-readable memory P150 may be any type of tangible computer-readable medium such as, for example, compact disk (CD), a CD-ROM, a floppy disk, a hard drive, a digital versatile disk (DVD), and/or a memory associated with the processor P106. Access to the memory P115, the memory P120, and/or the tangible computer-medium P150 may be controlled by a memory controller. In some examples, the coded instructions P110 are part of an installation pack and the memory is a memory from which that installation pack can be downloaded (e.g., a server) or a portable medium such as a CD, DVD, or flash drive. In some examples, the coded instructions are part of installed software in the RAM P115, the ROM P120, and/or the computer-readable memory P150.

The processor platform P100 also includes an interface circuit P130. Any type of interface standard, such as an external memory interface, serial port, general-purpose input/output, etc. may implement the interface circuit P130. One or more input devices P135 and one or more output devices P140 are connected to the interface circuit P130.

Although the above described example systems, methods, apparatus and articles of manufacture including, among other components, software and/or firmware executed on hardware, it should be noted that these examples are merely illustrative and should not be considered as limiting. For example, it is contemplated that any or all of the hardware, software, and firmware components could be embodied exclusively in hardware, exclusively in software, or in any combination of hardware and software. Accordingly, while the above described example systems, methods, apparatus, and articles of manufacture, the examples provided herein are not the only way to implement such systems, methods, apparatus, and articles of manufacture. For example, while the example systems, methods, apparatus, and articles of manufacturer have been described in conjunction with virtual machines, the example systems, methods, apparatus, and/or article of manufacture may operate within any structure that hosts virtual machines.

Although certain example systems, methods, apparatus and articles of manufacture have, been described herein, the scope of coverage of this patent is not limited thereto. On the contrary, this patent covers all systems, methods, apparatus and articles of manufacture fairly falling within the scope of the claims of this patent either literally or under the doctrine of equivalents.

What is claimed is:

1. A method to migrate virtual machines, comprising:
identifying via a processor a first virtual machine to be migrated from a first host to a second host to improve a performance of the first virtual machine;
determining that a number of migrations of the first virtual machine would not exceed a frequency threshold associated with the first virtual machine if the first virtual machine is migrated;
determining a reliability rating for the first virtual machine; and
migrating the first virtual machine to the second host based on the reliability rating and determining that the frequency threshold would not be exceeded.

2. The method of claim 1, further comprising determining a first security risk associated with migrating the first virtual machine, wherein migrating the first virtual machine is based on the security risk being less than a security threshold.

3. The method of claim 2, further comprising determining that a second virtual machine has a second security risk greater than the first security risk and greater than the security threshold, wherein identifying the first virtual machine occurs in response to determining that the second security risk is greater than the security threshold.

4. The method of claim 2, wherein the first security risk represents an impact that is less than a first impact threshold on a system if the first virtual machine is disrupted during the migration.

5. The method of claim 1, wherein determining that the number of migrations of the first virtual machine would not exceed frequency threshold comprises determining that a total number of times of migration of the first virtual machine during a time period does not exceed the frequency threshold.

6. The method of claim 1, wherein the reliability rating represents an expected difficulty for migrating the first virtual machine based on an observed difficulty of previously migrating the first virtual machine.

7. The method of claim 1, wherein the reliability rating is based on a complexity associated with applications operating on the first virtual machine.

8. The method of claim 1, wherein determining the reliability rating comprises determining the reliability rating based on a time of day, wherein different reliability ratings for the first virtual machine are used for different respective times of day.

9. The method of claim 1, further comprising determining a capacity of the second host, wherein the migrating comprises migrating based on the determined capacity.

10. The method of claim 1, wherein determining the reliability rating for the first virtual machine is based on at least one factor selected from among a previously monitored amount of time to migrate the first virtual machine and an amount of resources used to achieve migration of the first virtual machine.

11. The method of claim 10, further comprising modifying the reliability rating for the first virtual machine in response to migrating the first virtual machine from the first host to the second host.

12. A system comprising:
a processor; and
a non-transitory storage medium storing instructions executable on the processor to:
determine a security risk associated with migrating a first virtual machine from a first server to a second server;
determine whether the migrating of the first virtual machine would cause a number of migrations of the first virtual machine to exceed a frequency threshold associated with the first virtual machine; and
migrate the first virtual machine from the first server to the second server based on a comparison of a reliability rating associated with the first virtual machine to a reliability threshold, based on the security risk being lower than a security risk threshold, and based on the migrating of the first virtual machine not causing the frequency threshold to be exceeded.

13. The system of claim 12, wherein the instructions are executable on the processor to:
determine a performance of the first virtual machine operating on the first server; and
determine the second server has capacity for the first virtual machine.

14. The system of claim 12, wherein the first server and the second server are physically separate.

15. The system of claim 12, wherein the instructions are executable on the processor to determine the reliability rating of the first virtual machine based on an observed difficultly of previously migrating the first virtual machine and a time of day to migrate the first virtual machine.

16. The system of claim 12, wherein the instructions are executable on the processor to determine the reliability rating associated with the first virtual machine based on at least one factor selected from among a previously monitored amount of time to migrate the first virtual machine and an amount of resources used to achieve migration of the first virtual machine.

17. A non-transitory storage medium storing machine-readable instructions that, when executed, cause a machine to:
identify a first virtual machine to be migrated from a first host to a second host with available capacity;
determine that a number of migrations of the first virtual machine would not exceed a frequency threshold associated with the first virtual machine if the first virtual machine is migrated from the first host to the second host;
determine a reliability rating for the first virtual machine for a time of day the first virtual machine is to be migrated; and
migrate the first virtual machine to the second host based on the reliability rating and determining that the frequency threshold would not be exceeded.

18. The non-transitory storage medium of claim 17, wherein the machine-readable instructions, when executed, cause the machine to:
determine that a performance of the first virtual machine will be improved by migrating the first virtual machine from the first host to the second host; and
determine the performance of the first virtual machine by comparing a first number of resources of the first host used by the first virtual machine to operate to a second number of resources available to the first virtual machine at the first host.

19. The non-transitory storage medium of claim 17, wherein the machine-readable instructions, when executed, cause the machine to identify a second virtual machine to migrate from the first host to the second host:
if a security risk associated with migrating the first virtual machine from the first host to the second host is greater than a first threshold; or if the frequency threshold will be exceeded by migrating the first virtual machine from the first host to the second host.

20. The non-transitory storage medium of claim 17, wherein the machine-readable instructions, when executed, cause the machine to determine the reliability rating of the first virtual machine based on an observed difficultly of previously migrating the first virtual machine.

* * * * *